United States Patent
Aguilar

(10) Patent No.: US 7,940,994 B2
(45) Date of Patent: May 10, 2011

(54) MULTI-SCALE IMAGE FUSION

(75) Inventor: Mario Aguilar, Cary, NC (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 1031 days.

(21) Appl. No.: 11/599,092

(22) Filed: Nov. 14, 2006

(65) Prior Publication Data

US 2007/0183680 A1 Aug. 9, 2007

Related U.S. Application Data

(60) Provisional application No. 60/765,441, filed on Feb. 3, 2006, provisional application No. 60/597,068, filed on Nov. 15, 2005.

(51) Int. Cl.
G06K 9/40 (2006.01)
(52) U.S. Cl. ........ 382/261; 382/100; 382/254; 382/274; 382/276
(58) Field of Classification Search .................. 382/100, 382/190, 254, 260, 261
See application file for complete search history.

(56) References Cited

U.S. PATENT DOCUMENTS

| 5,555,324 | A * | 9/1996 | Waxman et al. | 382/254 |
| 6,885,482 | B1 * | 4/2005 | Kubo et al. | 382/274 |
| 7,609,318 | B2 * | 10/2009 | Zador | 348/351 |
| 2002/0154833 | A1 * | 10/2002 | Koch et al. | 382/325 |

OTHER PUBLICATIONS

Mario Aguilar and Aaron L. Garrett, "Biologically-Based Sensor Fusion for Medical Imaging" Proceedings of SPIE Image Data Fusion and Its Applications II, vol. 4385, pp. 149-158, 2001.*
Mario Aguilar, David A. Fay, W. D. Ross, Allen M. Waxman, David B. Ireland and Joseph P. Racamato, "Real-Time Fusion of Low-Light CCD and Uncooled IR Imagery for Color Night Vision" Proceedings of SPIE Conference on Enhanced and Synthetic Vision, vol. 3364, pp. 124-135, 1998.*
David A. Fay, Allen M. Waxman, Mario Aguilar, David B. Ireland, W.D. Ross, W.W. Streilein and M.I. Braun, "Fusion of Multi-Sensor Imagery for Night Vision: Color Visualization, Target Learning and Search" Proceedings of the Third International Conference on Information Fusion, vol. 1, pp. TUD3/3-TUD3/10, 2000.*
Zia-ur Rahman, Daniel J. Jobson, Glenn A. Woodell and Glenn D. Hines, "Multi-sensor Fusion and Enhancement using the Retinex Image Enhancement Algorithm", Proceedings of SPIE, Visual Information Processing XI, vol. 4736, Jul. 31, 2002, pp. 36-44.*
Zia-ur Rahman, Daniel J. Jobson and Glenn A. Woodell, "A Multiscale Retinex for Color Rendition and Dynamic Range Compression" Proceedings of SPIE, Enhancement and Restoration I, vol. 2847, pp. 183-191, 2004.*

* cited by examiner

*Primary Examiner* — Matthew C Bella
*Assistant Examiner* — Eric Rush
(74) *Attorney, Agent, or Firm* — Eric A. Gifford

(57) ABSTRACT

A multi-scale filter pyramid is applied to one or more components of a multi-component input image to produce a fused and enhanced image that can be mapped to a display, such as a color display.

17 Claims, 9 Drawing Sheets

Process: Compute Logistic Remap

- Parameters:
  - in
    - hfbImg: image produced by LHFBoost stage
    - S: steepness of logistic function
    - mean, std_dev: mean and standard deviation of hfbImg
    - maxVal: Target dynamic range (e.g. 255)
  - out
    - outImg (final image)
- Description:
  - for each pixel $i$, a remapped value is defined as:

$$\text{outImg}_i = \frac{\text{maxVal}}{1 + e^{-S(\text{hfbImg}_i - \text{mean})/\text{std\_dev}}}$$

FIG. 7

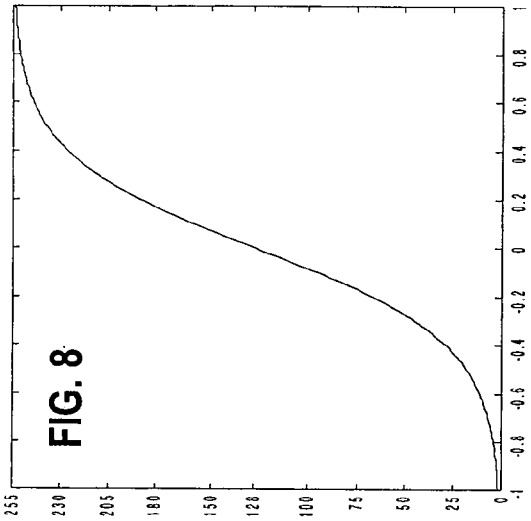

FIG. 8

MULTI-SCALE IMAGE FUSION

CROSS REFERENCE TO RELATED APPLICATIONS

This application relates to Provisional Application No. 60/597,068, entitled "Enhancement, Fusion, and Visualization of Third Generation FPA Imagery," of Mario Aguilar, filed Nov. 15, 2005.

This application also relates to Provisional Application No. 60/765,441, entitled "Multi-scale color fusion method," of Mario Aguilar filed Feb. 3, 2006.

This application also relates to application Ser. No. 11/599,091, entitled "Adaptive Dynamic Range Compression," of Mario Aguilar filed on even date herewith.

Applicant hereby incorporates by reference the entire contents of these three applications into this application.

TECHNICAL FIELD

This disclosure relates to imaging. More particularly, this disclosure relates to multi-scale processing of images to produce an enhanced image for display on an imaging device such as a color display.

BACKGROUND

Operators can tap into the complementary operational capabilities of different imaging sensors by using multiple sensors having different capabilities to image the same scene. Images produced by these multiple sensors are fused into a single gray scale or color image that may be displayed on an imaging device.

Waxman et al. U.S. Pat. No. 5,555,324 refers to an apparatus that images a single scene with a visible to near infrared camera and a long wavelength camera. Images produced by these cameras are processed by center-surround shunt processors into the color component images input to a color image display. The center-surround processors in the Waxman et al. patent are single scale processors which enhance the information in the sensor images that match the scale of the processors. The apparatus of the Waxman et al. patent however loses the image information at other scales. It also has a tendency to enhance high frequency noise.

Additionally, the apparatus of the Waxman et al. patent relies on a center-surround processor with limited spatial interactions. On the other hand, the invention presented here replaces it with the multi-neighborhood center-surround processor as its core image enhancement and fusion operator.

SUMMARY

This invention produces a fused image from a plurality of imaging sensors by combining both multiple neighborhood operators to enhance the images and multiple scale operators to capture complementary information content at multiple detail levels.

Additionally, this invention solves the limitations of the apparatus of the Waxman et al. patent through the use of multiple-scale processing to combine multiple images of the same scene from one or more imaging devices. Specifically, the invention involves the combination of multiple images of the same scene from one or more imaging sensors by using one or more multi-scale filter pyramids where, at each level of the pyramid, a center-surround operator of increasing scale is used to enhance the combined image at the respective scale.

BRIEF DESCRIPTION OF THE DRAWINGS

FIG. 7 is a specification of the transfer function of the logistic remapping circuit of FIG. 6.

FIG. 8 is a graphical representation of the transfer function of the logistic remapping circuit of FIG. 6.

DETAILED DESCRIPTION

Figure 1:
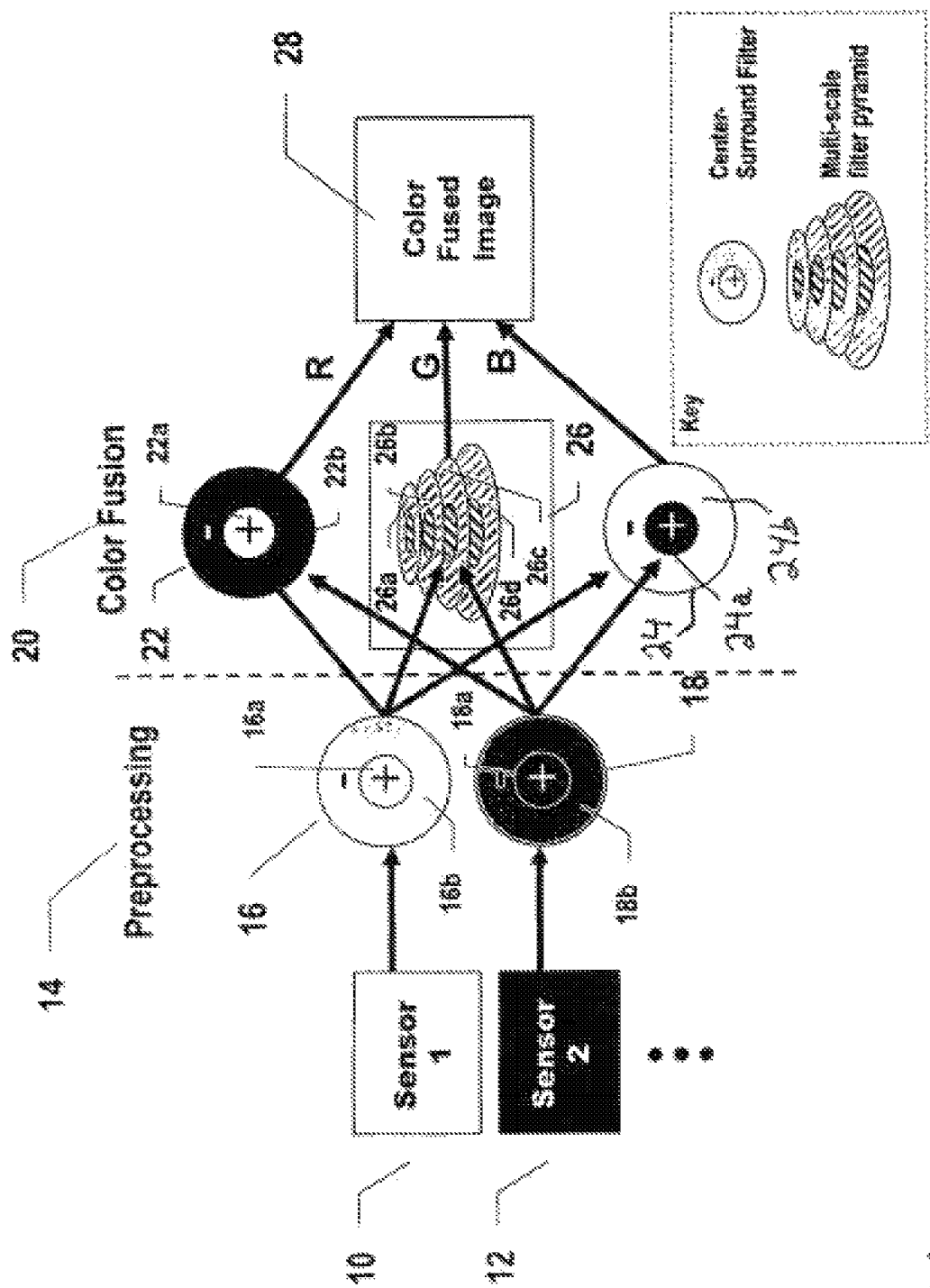
FIG. 1 is a block diagram of a first embodiment of the invention.

Multiple images from one or more imaging sensors are fused into a single image that preserves the complementary information in the original images. Center-surround operators implemented as filters separately enhance the contrast of input images. The center-surround filters also adaptively normalize the enhanced images.

In one example of the invention, a first one of the enhanced images is input to the center portion of a third center-surround filter and a second one of the enhanced images is input to the surround portion of the third center-surround filter. The output of this third filter is one of the component input signals sent to a color display. The first of the enhanced images is input to the surround portion of a fourth center-surround filter and second of the enhanced images is input to the center portion of the fourth center-surround filter. The output of the fourth filter is a second component input signal of the color display. The first and second enhanced images also are input to a series of center-surround filters of gradually increasing scale. The outputs of these filters are combined to form a third input to the color display.

In another example of the invention, instead of the first two component inputs to the color display being produced by single filters, the first and second component inputs to the color display may be produced by a series of gradually increasing scale center-surround filter banks.

Center-surround filters are well known imaging filters that are modeled after the processing performed by the human visual system. Center-surround filters perform a contrast and information enhancement function in this invention. The filters also perform an adaptive normalization function.

The transfer functions of center-surround filters used in this invention include a center portion that takes each pixel value of an input image and produces a first processed pixel value that is a function of the input pixel value and input pixel values in a small first region of the input image in the vicinity of the input pixel. It does this by applying a small scale Gaussian operator to the input pixel and a small region of the image surrounding the pixel.

The transfer function of the center-surround filters used in this invention also include a surround portion that takes each pixel value of the input image and produces a second processed pixel value that is a function of the input pixel value and pixel values in a larger second region of the input image in the vicinity of the input pixel. It does this by applying a larger scale Gaussian operator to the input pixel and a larger region surrounding the input pixel. Each first processed pixel value from the center section of the filter may be combined with a corresponding second processed pixel value from the surround portion of the filter to produce a combined pixel value that can be normalized. The normalized pixel value then can be one output pixel value in an output image from the filter.

As discussed below, depending on the application, pixel values from the same image may be input to the center and surround portions of a center-surround filter. In other applications, pixel values from different images may be input to the center portion and the surround portion of the filter. Also as discussed below, an image may be processed by a parallel connected bank or stack of center-surround filters, each filter in the filter bank having a different size or scale. For example, the individual filters in a filter bank may have the same constant size Gaussian operator applied to a fixed size first region of the input image around each pixel in the image; the size of the surround Gaussian operator gradually increases from filter to filter in the stack; or the same surround Gaussian operators are applied to respective gradually increasing surround regions in the input image around each pixel in the image. Changing the size of center Gaussian operator and the first region over which it is applied is also possible.

Generally, the operation of a center-surround filter may be represented as follows:

Output pixel value of the filter=(Difference of Gaussians)/(Normalization Factor)  (1)

More specifically, the operation of a center-surround filter may be represented as follows;

$$x_i = \frac{B \cdot I_{center} * G_{center} - C \cdot I_{surround} * G_{surround}}{NormalizationFactor} \quad (2)$$

where i is an index to a pixel in an input image or to a corresponding pixel in an output image and $x_i$ is the value of the ith pixel in an output image produced by the filter. $I_{center}$ is a matrix of values composed of the pixel value of an input pixel i and pixel values in a first small region surrounding input pixel i; $I_{surround}$ is a matrix of values composed of the pixel value of input pixel i and pixel values in a second region surrounding input pixel i that is larger than the first region. $G_{center}$ is an M×M Gaussian matrix centered on the input pixel i and $G_{surround}$ is an N×N Gaussian matrix centered on input pixel i, where N is greater M. B and C are constants and * is the convolution operator. The size or scale of the filter is the size of the Gaussians applied to input images.

In a preferred example of the invention, the operation of a center-surround filter is as follows:

$$x_i = \frac{B \cdot I_{center} - C \cdot I_{surround} * G_{surround}}{NormalizationFactor} \quad (3)$$

A preferable normalization factor in Equation (3) is the mean of the pixel values in a P×P neighborhood of input pixel i, where P is greater than N, for example 10N. In the center portion, the filter represented by Equation (3) applies a one pixel Gaussian to the input pixel i. In the surround portion of the filter of FIG. (3), an N×N Gaussian centered about input pixel i is applied to input pixel i.

As described below, the same image may be applied to both the center and surround portions of a center-surround filter. Different images of the same scene may applied to center and surround portions of a center-surround filter, respectively. Although some specific center-surround filters are described here, the invention, however, is not limited to any particular form of center-surround filter.

FIG. 1 is a block diagram of a detailed first embodiment of the invention. The embodiment shown in FIG. 1 includes a first sensor 10 and a second sensor 12. The first sensor 10 views a scene and produces an image that represents a predetermined detectable characteristic of the scene or target, such as the amount of reflected or emitted light in a particular band of the electromagnetic energy spectrum. The image produced by the sensor 10 is a two dimensional array of pixels, each pixel representing a small region of the scene and having a pixel value representing a measurement of the detectable characteristic in the region represented by the pixel. For example, the sensor 10 may be a mid-wave infrared (MWIR) image sensor operating in the 3-5 micron band of the infrared spectrum. The second sensor 12 also views the same scene viewed by the sensor 10, but produces an image composed of pixels having pixel values that represents a measure of a different detectable characteristic of the scene such as the amount of energy emitted or reflected in different bands of the electromagnetic energy spectrum. For example, the sensor 12 may be a long-wave infrared (LWIR) image sensor operating in the 8-12 micron band of the electromagnetic energy spectrum.

The output images from the two sensors 10 and 12 are input to a preprocessing block 14 in FIG. 1. The preprocessing block 14 comprises two center-surround filters 16 and 18. The filter 16 has a center portion 16a and a surround portion 16b; the filter 18 has a center portion 18a and a surround portion 18b. The image from the sensor 10 is input to both the center section 16a and the surround section 16b of the filter 16; the image from the sensor 12 is input to both the center section 18a and the surround section 18b of the filter 18. The filters 16 and 18 enhance the contrast and information content of the images from the sensor 10 and 12. Filters 16 and 18 also provide adaptive normalization and channel equalization of the processed images they produce.

The preprocessed images output by thee preprocessing stage 14 are input to a color fusion stage 20. In this example of the invention, the color fusion stage 20 comprises a center-surround filter 22 having a center portion 22a and a surround portion 22b. The center portion 22a receives the preprocessed image from filter 16; the surround portion 22b receives the preprocessed image from the filter 18. The output of the filter 22 is the red component R of color image. The color fusion stage 20 also includes a filter 24. The filter 24 comprises a center portion 24a and a surround portion 24b. The center portion 24a receives the preprocessed image from the filter 18; the surround portion 24b receives the preprocessed image from filter 16. The output of the filter 24 is the blue component B of a color image. The color fusion stage 20 also includes a multi-scale center-surround filter bank 26 that receives both the preprocessed images from filters 16 and 18. A multi-scale filter bank 26 comprises a plurality of center-surround filters 26a, 26b, 26c, and 26d. Each of the filters 26a, 26b, 26c, and 26d operate like filters 16, 18, 22, and 24 but have respective different size Gaussian operators. The images from filters 16 and 18 are simultaneously applied to each of the filters 26a, 26b, 26c, and 26d in the filter bank 26. The outputs of the filters 26a, 26b, 26c, and 26d are merged to create the green component G of a color image. The R, G, and B components from the color fusion stage 20 are combined to create a fused color image 28.

Figure 2:
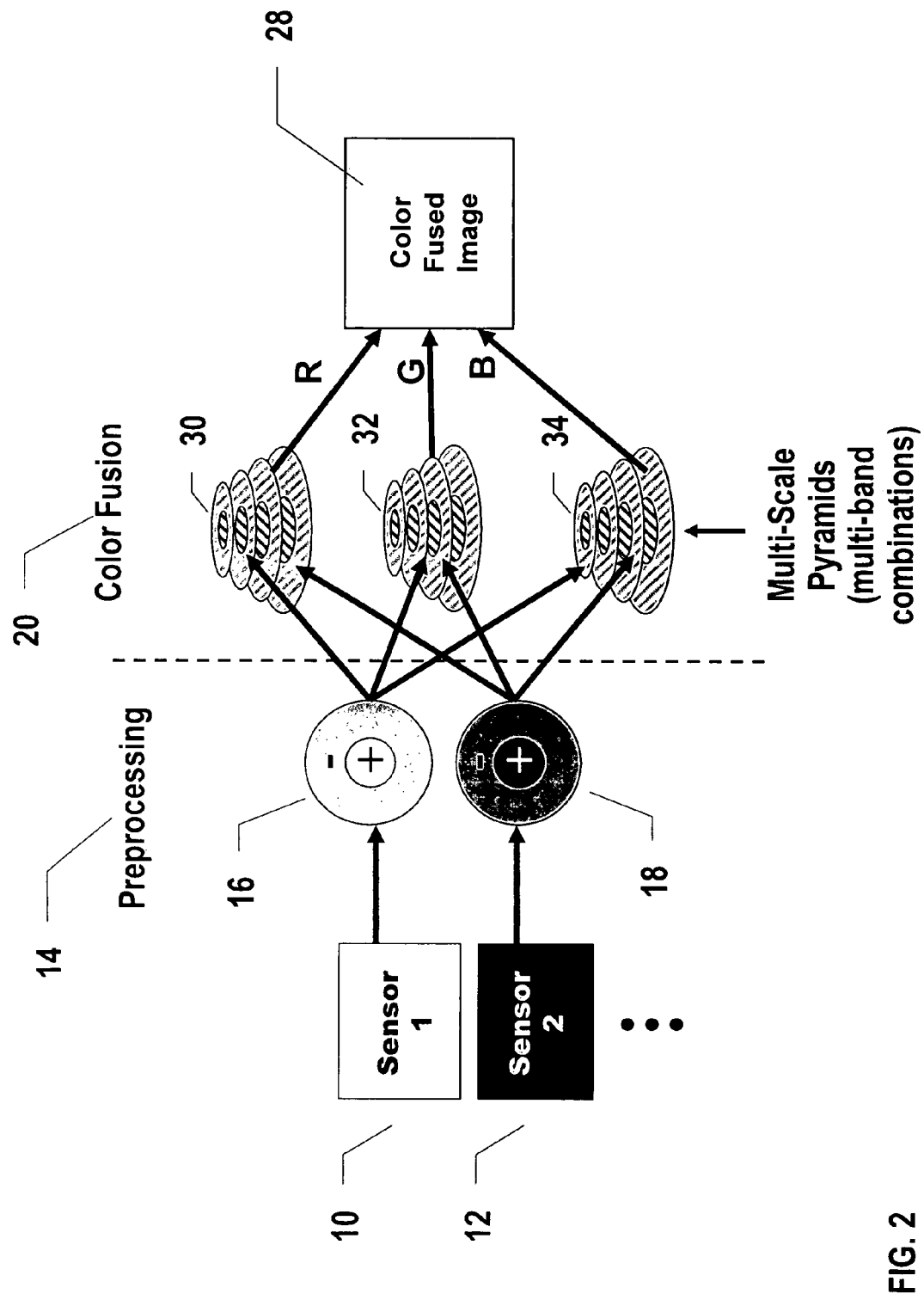
FIG. 2 is a block diagram of a second embodiment of the invention.

FIG. 2 shows an alternative embodiment of the invention in which multi-scale filter banks 30, 32, and 34 are each responsive to the preprocessed images from filters 16 and 18 to produce respective R, G, and B components of the fused image 28.

Figure 3:
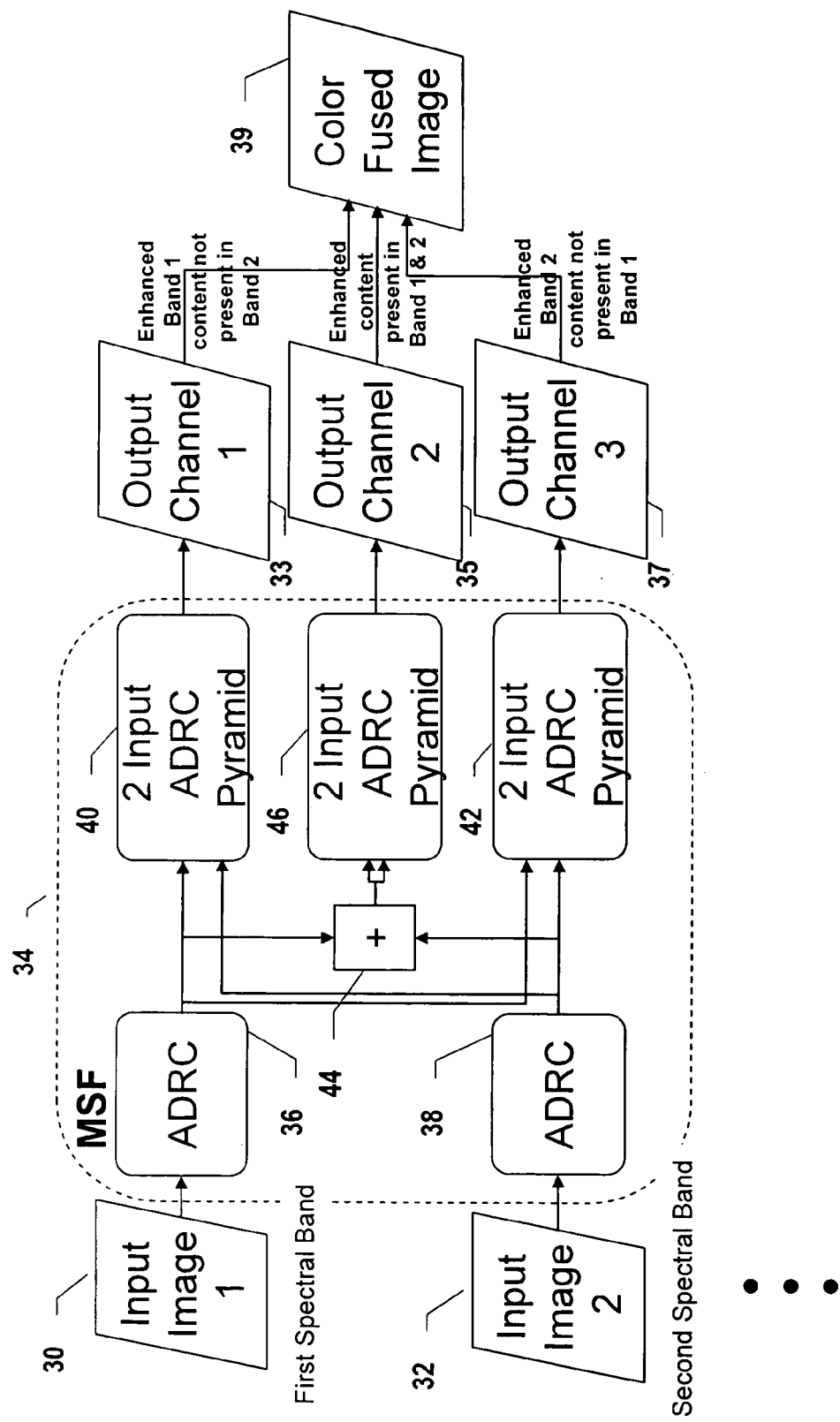
FIG. 3 is a more detailed diagram representing one example of the FIG. 2 architecture.

FIG. 3 shows a detailed example of the architecture shown in FIG. 2. The apparatus of FIG. 3 implements the center-surround filters as adaptive dynamic range compression (ADRC) processors described in detail below. A plurality of input images is fed to a multi-scale fusion (MSF) processor 34 which outputs three enhanced images into output channels 33, 35, and 37. The enhanced images from the processor 34 are combined into a fused color image 38 which may be displayed on a color monitor or other display not shown in FIG. 3. Any number of input images may fed to the MSF processor 34, only two of which are illustratively shown in FIG. 3. Each input image is taken in a specific band of the electromagnetic energy spectrum, either by a separate sensor for each band or by one or more sensors that image more than one band. Input image 30 of a scene taken in a first spectral band (band 1) is input to an ADRC processor 36 and another input image 32 taken in a second spectral band (band 2) is input to another ADRC processor 38. ADRC processors 36 and 38 preprocess the input images 30 and 32 in a fashion similar to the way the input images from sensors 10 and 12 are preprocessed by the preprocessing stage 14 in FIGS. 1 and 2.

The preprocessed image from ADRC processor 36 and the preprocessed image from ADRC processor 38 are input to a 2-input ADRC pyramid processor 40 which outputs an image to output channel 33 that has enhanced band 1 content not present in band 2. Band 1 is decorrelated from band 2 by using band 1 as input to the center portions of a bank of different scale center-surround filters in the pyramid processor 40 and using band 2 as input to the surround portions of the center-surround processors in the filter bank of processor 40. The preprocessed image from ADRC processor 36 and the preprocessed image from ADRC processor 38 also are input to a 2-input ADRC pyramid processor 42 which outputs an image to output channel 37 that has enhanced band 2 content not present in band 1. Band 2 is decorrelated from band 1 by using band 2 as input to the center portions of another bank of different scale center-surround filters in the pyramid processor 42 and using band 1 as the input to the surround portions of the center-surround filters in the filter bank of processor 42. The images from processors 36 and 38 are linearly combined together by adder block 44 and the resultant image is input to a third 2-input ADRC pyramid processor 46 which sends an output image to output channel 35. The linear combination from block 44 is input to both the center portions and surround portions of a bank of double multi-scale opponent filters in processor 46. The operation of processor 46 enhances correlated information in bands 1 and 2.

The use of a multi-scale bank of center-surround filters as in FIG. 3 allows the fusion process to decorrelate and enhance multi-band information irrespective of the scale of the features or objects of interest in the imagery.

Figure 4:
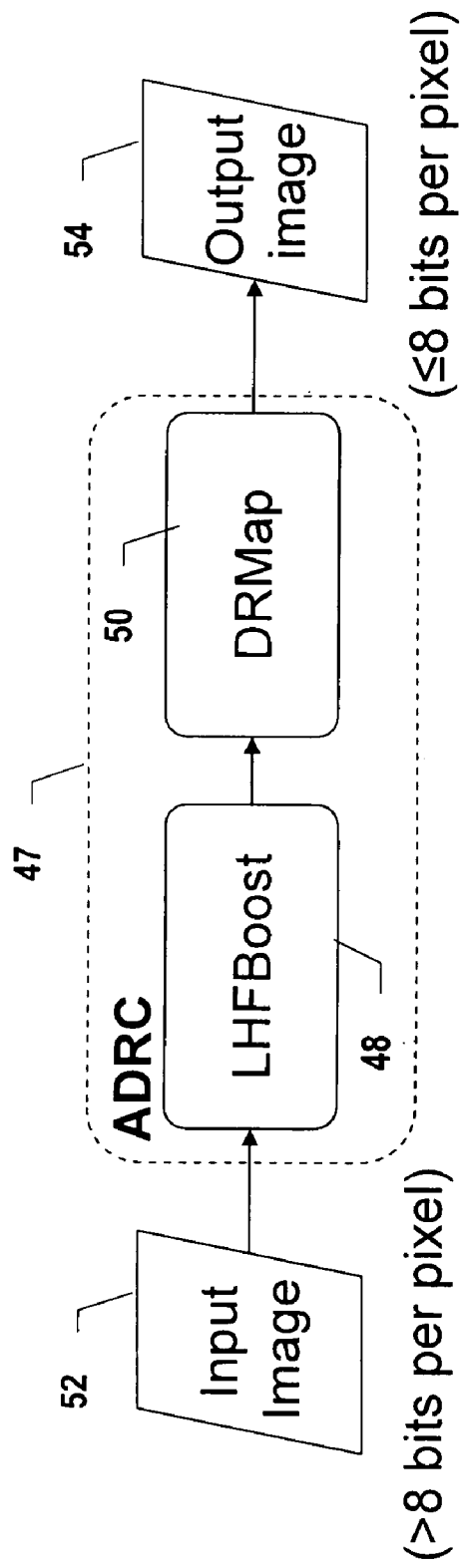
FIG. 4 is a block diagram of an adaptive dynamic range processor of FIG. 3.

FIG. 4 is a high level block diagram of an ADRC processor block 47 like the ADRC processors 36 and 38 in FIG. 3. The ADRC processor 47 includes two main components, a local high frequency boost circuit 48 in series with a dynamic range map circuit 50 connected between an input image 52 and output image 54.

Figure 5:
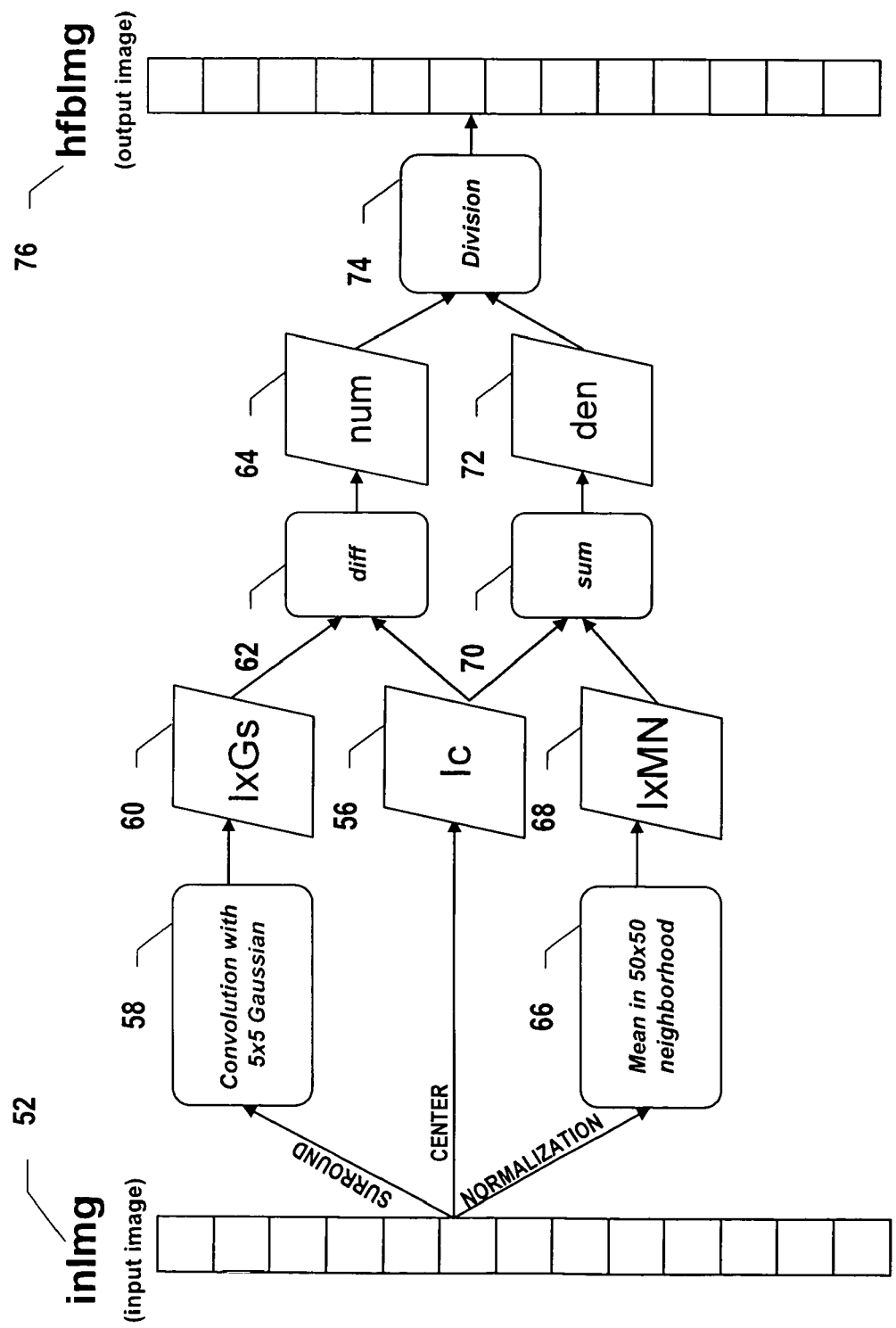
FIG. 5 is a block diagram of the local high frequency boost circuit of FIG. 4.

FIG. 5 shows the details of the boost circuit 48. The boost circuit 48 has three main components, a center portion, a surround portion, and a normalization portion. In the center portion, each pixel value of the image 52 is entered into a register 56. In the surround portion, each pixel value of the image 52 is undergoes convolution with an N×N Gaussian operator in block 58. The result of the operation of block 58 is stored in block 60. The difference between the contents of blocks 56 and 60 is computed in block 62. The result of the computation in block 62 is a difference of Gaussians value (the content of block 56 is essentially a convolution of the image 52 with a one pixel Gaussian operator) which is stored in block 64. In the normalization portion, block 66 computes the mean of the pixel values in the image 52 in a P×P region around each pixel value sent to the center and surround portions of the boost circuit 48. The result of the computation performed by block 66 is stored in register 68. The contents of the registers 56 and 68 are summed together in block 70 to produce a normalization value which is stored in register 72. The difference of Gaussians value in register 64 is divided by the normalization value in register 72 in block 74. The output of block 74 is the image 76 sent to the dynamic range map circuit 50 in FIG. 4.

The size of the Gaussian operator in the center portion of the boost circuit 48 is smaller than the size of the Gaussian operator used in the surround portion of the boost circuit 48; the region over which the block 66 measures the mean value of the input image is larger than the Gaussian operator used by the surround portion of the circuit 48. For example, the size of the Gaussian used in the center portion is one pixel, the size of the Gaussian used in the surround portion is a 5×5 matrix, and the mean is computed in a 50×50 neighborhood of each pixel in the input image.

Figure 6:
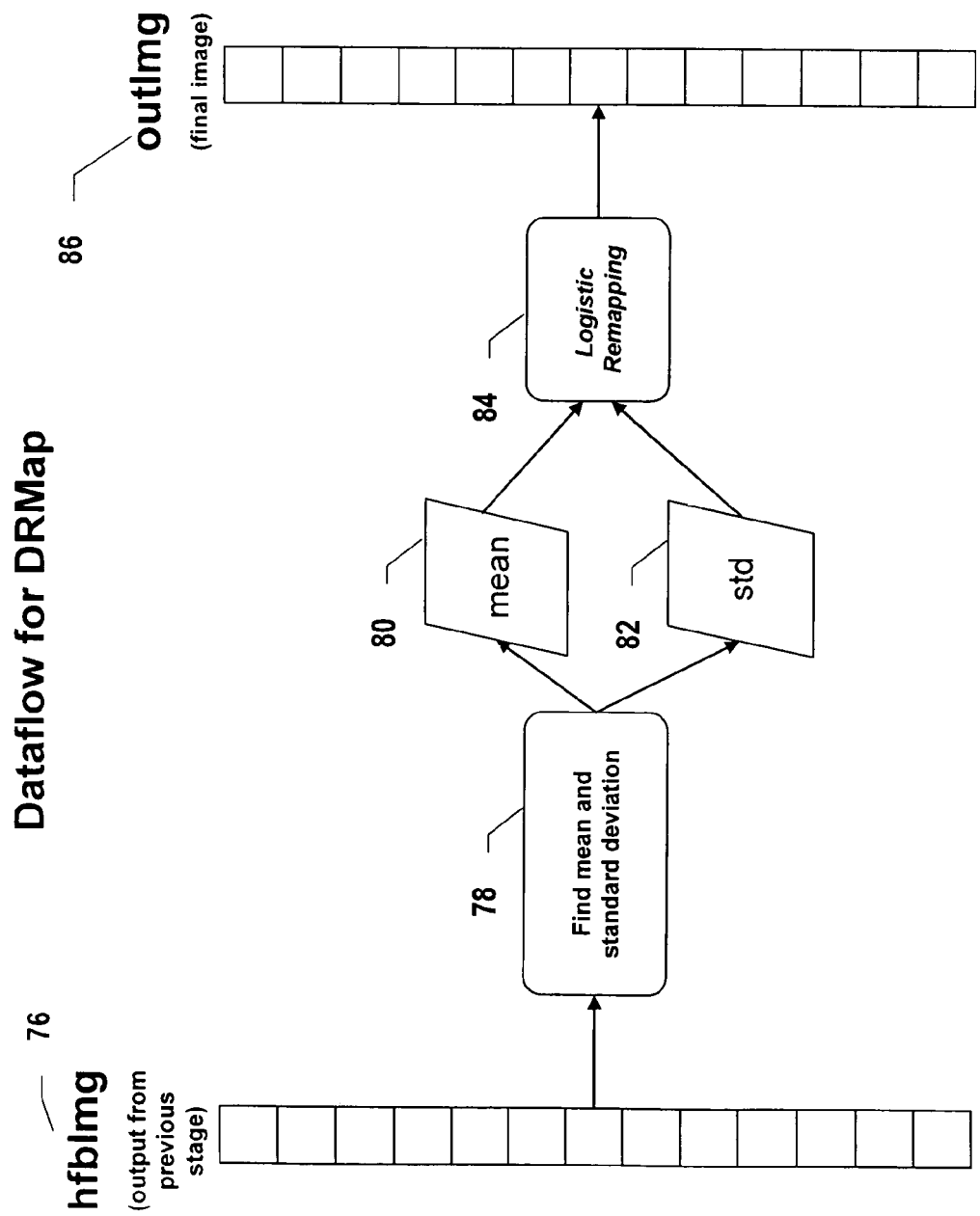
FIG. 6 is a block diagram of the dynamic range mapping circuit of FIG. 4.

The image 76 is fed to a block 78 in the dynamic range map circuit 50 shown in FIG. 6. Block 78 computes the mean and standard deviation of the image 78. The block 78 stores the mean in block 80 and the standard deviation in block 82. A logistic remapping circuit 84 receives the contents of blocks 80 and 82 and remaps the image 76 to an output image 86 of the ADRC processor 47.

The logistic remap circuit 84 operates in accordance with FIG. 7. The circuit 84 receives the image produced by the boost circuit 48, a steepness parameter S, the mean and standard deviation std_dev values from blocks 80 and 82, and a target dynamic range value maxValue and produces an output image where, for each pixel i, the remapped value is defined as: $\text{outImg}_i = (\text{maxVal})/1 + e^{-S(hfbImg_i - mean)/std\_dev}$. A graphical depiction of the transfer function of the logistical remapping circuit 84 is shown in FIG. 8.

Figure 9:
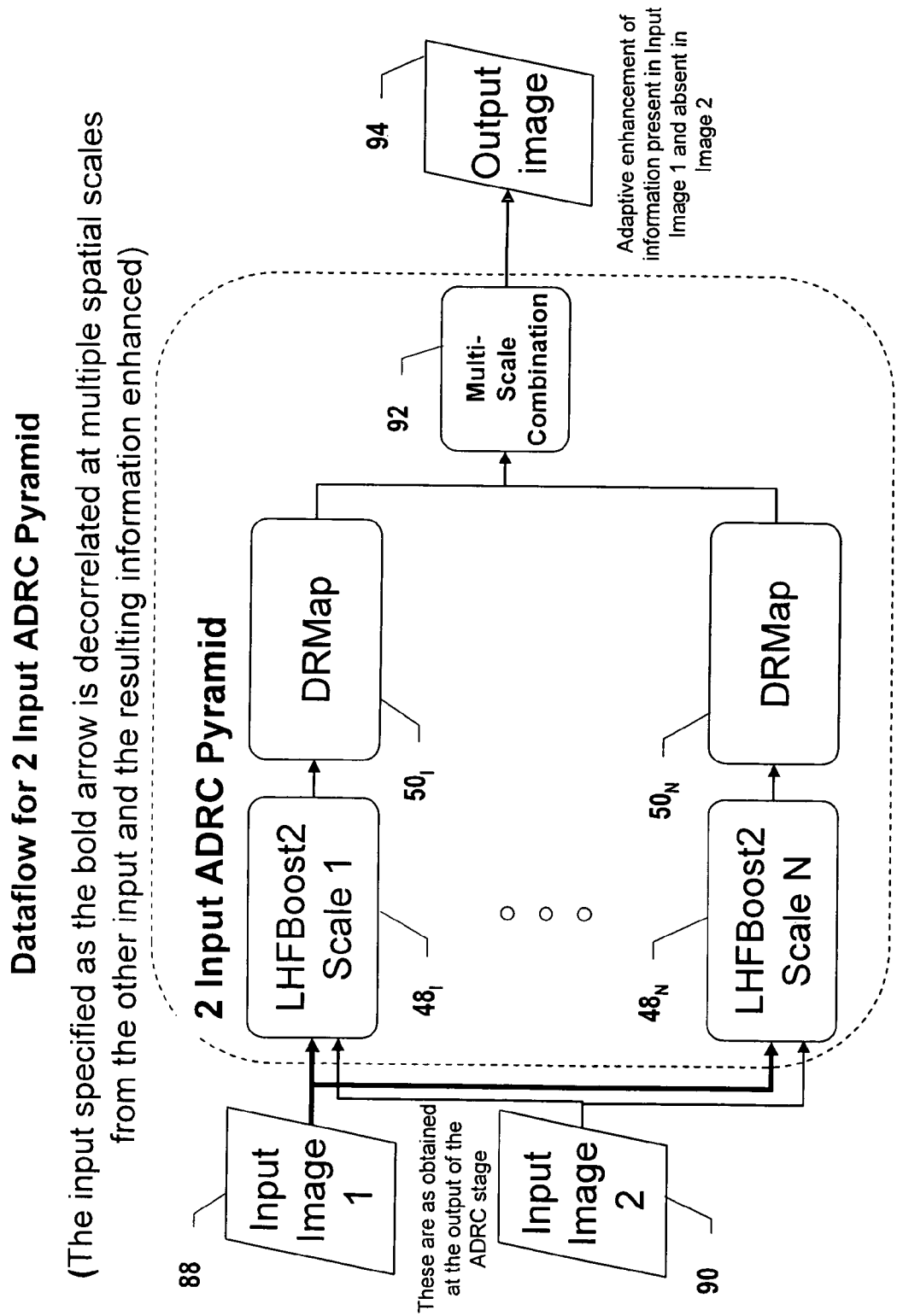
FIG. 9 is detailed block diagram of a two input adaptive dynamic range pyramid processor of FIG. 3.

FIG. 9 is a detailed block diagram of one of the 2-input ADRC pyramid processors 40, 42, and 46 in FIG. 3. The 2-input ADRC pyramid processors 40, 42, and 46 each comprise a filter bank composed of a multiple scale center-surround filter bank, such as a bank of ADRC filters, composed of boost circuits $48_1, \ldots, 48_N$ in series with dynamic range mapping circuits $50_1, \ldots, 50_N$. Each of the boost circuits $48_1, \ldots, 48_N$ has a respective spatial scale (Scale1, Scale 2, ..., Scale N) as shown in FIG. 9. In this example of the invention the term scale refers to the size of the Gaussian operators that are used in the boost circuits in the ADRC processors of the ADRC pyramid processors.

The invention is not limited to any particular size for the Gaussian operators as long as the Gaussian operators used in the center portions of the center-surround filters are less than the sizes of the Gaussians used in the respective surround portions of the center-surround filters. One example of Gaussian operators that can be used in the filter bank is to use one pixel size Gaussian operators in the center portions of the filters and Gaussians of gradually increasing size in the surround portions of the filters such as 3×3, 7×7, 11×11, 15×15, etc. Gausssians operators. Other size Gaussian operators are also possible. The filter bank receives two separate images 88 and 90. One of the images 88 is decorrelated at multiple spatial scales from the other input image 90 and the resulting enhanced information is combined by block 92 into an output image 94.

Figure 10:
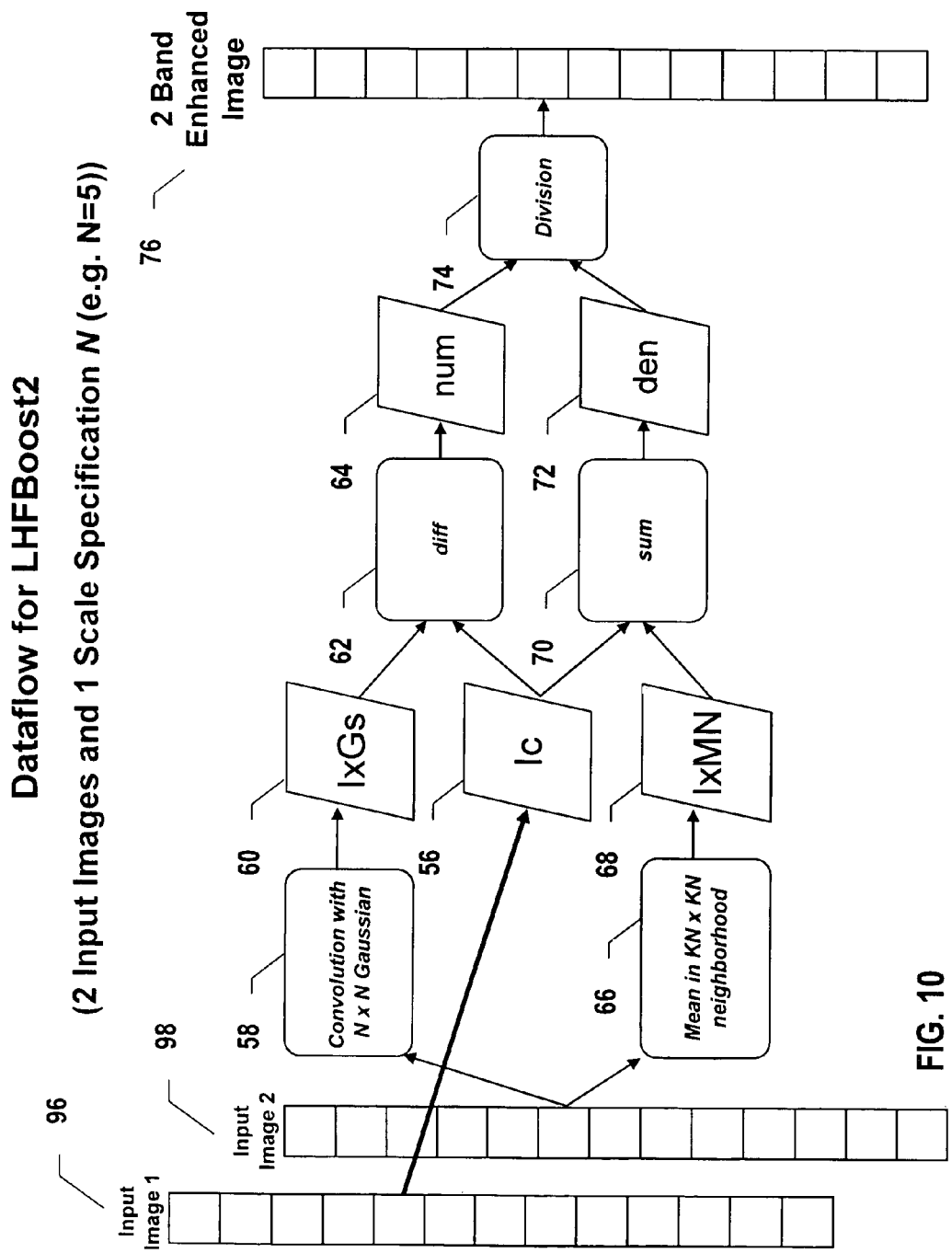
FIG. 10 is a detailed block diagram of a local high frequency boost circuit in the two input adaptive dynamic range pyramid processor of FIG. 9.

FIG. 10 shows the details of the HF boost circuits in the 2-input ADRC processors used in the ADRC pyramid processors 40, 42, and 46. The center portions of the boost circuits receive one image 96 and the surround portions of the boost circuits receive another image 98. In the case of the boost circuits in the ADRC pyramid 40, the output image from the processor 36 is image 96 and the output image from processor 38 is image 98. In the case of the boost circuits in the ADRC pyramid 42, the output image from the processor 38 is image 96 and the output image from processor 36 is image 98. In the case of the boost circuits in the ADRC pyramid 46, the combined image from block 44 is input to both the center portions and the surround portions of the boost circuits in the filter bank in the ADRC pyramid 46.

Although the embodiments of the invention described here involve processing two input images of the same scene, the invention is not limited to processing any particular number of input images of a scene. For example, the invention may process three input images such as the red, green, and blue images produced by a color camera to produce a fused color image. Another example would be the processing of visible, mid-wavelength infrared, and long-wavelength infrared images to produce a fused image.

The Title, Technical Field, Background, Summary, Brief Description of the Drawings, Detailed Description, and Abstract are meant to illustrate the preferred embodiments of the invention and are not in any way intended to limit the scope of the invention. The scope of the invention is solely defined and limited by the claims set forth below.

The invention claimed is:

1. An imaging apparatus, comprising:
    a first input image of a scene;
    a second input image of the scene;
    a first center-surround filter adapted to receive the first input image and to produce a first preprocessed image in response to the first input image;
    a second center-surround filter adapted to receive the second input image and to produce a second preprocessed image in response to the second input image;
    a first multi-scale center-surround filter comprising a plurality of center-surround filters each adapted to receive and process the first and second preprocessed images to produce respective first output images at different scales, each said filter separately applying a contrast enhancement operator to each pixel in the first and second preprocessed images and an adaptive normalization factor to the enhancement operation at a different scale, wherein the contrast enhancement operator is applied to center and surround regions around each pixel in said first and second preprocessed images and the adaptive normalization factor is extracted from a normalization region around each pixel from the same said image as the surround region, said normalization region being larger than said center and surround regions but smaller than the entirety of said first and second preprocessed images, said first multi-scale center-surround filter merging said first output images to produce at least a first component image of a fused image; and
    a display that displays the fused image.

2. The imaging apparatus of claim 1, wherein each center-surround filter of the first multi-scale center-surround filter is adapted to process a sum image of the first and second preprocessed images in both center and surround portions of the first multi-scale center-surround filter and to extract the adaptive normalization factor from said sum.

3. The imaging apparatus of claim 2, further comprising:
    a third center-surround filter adapted to receive the first preprocessed image and to process the first preprocessed image in a center portion of the third center-surround filter;
    the third center-surround filter also adapted to receive the second preprocessed image and to process the second preprocessed image in a surround portion of the third center-surround filter;
    the third center-surround filter being adapted to produce a second component of a fused image;
    a fourth center-surround filter adapted to receive the first preprocessed image and to process the first preprocessed image in the surround portion of the fourth center-surround filter;
    the fourth center-surround filter also adapted to receive the second preprocessed image and to process the second preprocessed image in the center portion of the fourth center-surround filter;
    the fourth center-surround filter being adapted to produce a third component of a fused image.

4. The imaging apparatus of claim 2, further comprising:
    a second multi-scale center-surround filter comprising a plurality of center-surround filters each adapted to receive and process the first and second preprocessed images in the center and surround portions of the second multi-scale center-surround filter, respectively, to produce respective second output images at different scales, each said filter separately applying a contrast enhancement operator to each pixel in the first and second preprocessed images and an adaptive normalization factor extracted from the second preprocessed image to the enhancement operation at a different scale, said second multi-scale center-surround filter merging said second output images to produce a second component image of the fused image; and
    a third multi-scale center-surround filter comprising a plurality of center-surround filters each adapted to receive and process the first and second preprocessed images in the surround and center portions of the third multi-scale center-surround filter, respectively, to produce respective third output images at different scales, each said filter separately applying a contrast enhancement operator to each pixel in the second and first preprocessed images and an adaptive normalization factor extracted from the first preprocessed image to the enhancement operation at a different scale, said third multi-scale center-surround filter merging said third output images to produce a third component image of the fused image.

5. The imaging apparatus of claim 1, wherein the adaptive normalization factor comprises a mean of pixel values in the normalization region.

6. The imaging apparatus of claim 1, wherein the fused image comprises the first component image, a second component image and a third component image, said display comprising a color display device adapted to receive the first, second and third component images of the fused image, map each component image to a respective color and to display the fused image.

7. The imaging apparatus of claim 1, in which the first input image is produced by a first sensor sensitive to electromagnetic energy in a first portion of the electromagnetic energy spectrum and the second input image is produced by a second sensor sensitive to electromagnetic energy in a second portion of the electromagnetic energy spectrum.

8. The imaging apparatus of claim 7, in which the first sensor is a mid-wave infrared imaging device and the second sensor is a long-wave infrared imaging device.

9. The imaging apparatus of claim 1, further comprising:
a sensor responsive to electromagnetic energy in a first portion of the electromagnetic energy spectrum to produce the first input image and to electromagnetic energy in a second portion of the electromagnetic energy spectrum to produce the second input image.

10. An imaging apparatus, comprising:
a multi-scale center-surround filter comprising a plurality of center-surround filters each adapted to apply a contrast enhancement operator to center and surround regions around each pixel in first and second images and an adaptive normalization factor extracted from a normalization region around each said pixel to the enhancement operation to produce respective first output images at different scales, said normalization region being larger than said center and surround regions but smaller than the entirety of said first and second images and being extracted from the same image as said surround region, said multi-scale center-surround filter merging said first output images to produce at least a first component image of a fused image; and
a display that displays the fused image.

11. A method of processing a plurality of images comprising the step of:
processing a first input image in a first center-surround filter to produce a first preprocessed image;
processing a second input image in a second center-surround filter to produce a second preprocessed image;
processing the first and second preprocessed images in a first multi-scale center-surround filter bank, said filter bank comprising a plurality of center-surround filters each adapted to apply a contrast enhancement operator to center and surround regions around each pixel in the first and second preprocessed images and an adaptive normalization factor extracted from a normalization region around each said pixel to the enhancement operation to produce respective first output images at different scales, said normalization region being larger than said center and surround regions but smaller than the entirety of said first and second preprocessed images and being extracted from the same image as said surround region, said first multi-scale center-surround filter bank merging said first output images to produce at least a first component image of a fused image.

12. The method of claim 11, wherein processing the first and second preprocessed images in the first multi-scale center-surround filter bank comprises:
receiving and processing a sum image of the first and second preprocessed images in both the center and surround portions of each said center surround filter and producing respective outputs at different scales, said adaptive normalization factor extracted from the normalization region in the sum image, said first component image comprising enhanced image detail present in both said first and second preprocessed images.

13. The method of claim 12, further comprising:
processing the first and second preprocessed images in a second multi-scale center-surround filter bank, said second multi-scale surround filter bank comprising a plurality of center-surround filters each adapted to apply a contrast enhancement operator to center and surround regions around each pixel in the first and second preprocessed images, respectively, and an adaptive normalization factor extracted from a normalization region around each said pixel in said second image to the enhancement operation to produce respective second output images at different scales, said normalization region being larger than said center and surround regions but smaller than the entirety of said first and second preprocessed images, said second multi-scale surround filter bank merging said second output images to produce a second component image of the fused image;
processing the first and second preprocessed images in a third multi-scale center-surround filter bank, said third multi-scale center-surround filter bank comprising a plurality of center-surround filters each adapted to apply a contrast enhancement operator to center and surround regions around each pixel in the second and first preprocessed images, respectively, and an adaptive normalization factor extracted from a normalization region around each said pixel in said first image to the enhancement operation to produce respective third output images at different scales, said normalization region being larger than said center and surround regions but smaller than the entirety of said first and second preprocessed images, said third multi-scale surround filter bank merging said third output images to produce a third component image of the fused image; and
mapping each of said first, second and third component images to respective colors and displaying the fused image on a colored display.

14. The imaging apparatus of claim 10, wherein the plurality of center-surround filters in the first multi-scale center-surround filter bank are each adapted to receive and process a sum image of the first and second input images in both center and surround regions of the filter to produce respective first output images at different scales, said adaptive normalization factor extracted from the normalization region in said sum image.

15. The imaging apparatus of claim 14, further comprising:
a second multi-scale center-surround filter bank, said filter bank comprising a plurality of center-surround filters each adapted to receive and apply a contrast enhancement operator to center and surround regions around each pixel in the first and second input images, respectively, and an adaptive normalization factor extracted from a normalization region around each said pixel from said second input image to the enhancement operation to produce respective second output images at different scales, said normalization region being larger than said center and surround regions but smaller than the entirety of said first and second input images, said second multi-scale center-surround filter bank merging said second output images to produce a second component image of the fused image; and
a third multi-scale center-surround filter bank, said filter bank comprising a plurality of center-surround filters each adapted to receive and apply a contrast enhancement operator to center and surround regions around each pixel in the second and first input images, respectively, and an adaptive normalization factor extracted from a normalization region around each said pixel from said first input image to the enhancement operation to produce respective third output images at different scales, said normalization region being larger than said center and surround regions but smaller than the entirety of said first and second input images, said third multiscale center-surround filter bank merging said third output images to produce a third component image of the fused image.

16. An imaging apparatus, comprising:
a first input image of a scene;
a second input image of the scene;
a first center-surround filter adapted to receive the first input image and to produce a first preprocessed image in response to the first input image;
a second center-surround filter adapted to receive the second input image and to produce a second preprocessed image in response to the second input image;
a first multi-scale center-surround filter bank, said filter bank comprising a plurality of center-surround filters each adapted to apply a contrast enhancement operator to each pixel in a sum image of the first and second preprocessed images in both center and surround portions of the filter and an adaptive normalization factor extracted from the sum image to the enhancement operation to generate first output images at different scales, said first multi-scale center-surround filter bank merging said first output images to produce a first component image of the fused image, said first component image comprising enhanced image detail present in both said first and second preprocessed images;
a second multi-scale center-surround filter bank, said filter bank comprising a plurality of center-surround filters each adapted to apply a contrast enhancement operator to each pixel in the first and second preprocessed images in center and surround portions of the filter, respectively, and an adaptive normalization factor extracted from the second preprocessed image to the enhancement operation to generate second output images at different scales, said second multi-scale center-surround filter bank merging said second output images to produce a second component image of the fused image, said second component image comprising enhanced image detail present in said first preprocessed image and not present in said second preprocessed image;
a third multi-scale center-surround filter bank, said filter bank comprising a plurality of center-surround filters each adapted to apply a contrast enhancement operator to each pixel in the first and second preprocessed images in surround and center portions of the filter, respectively, and an adaptive normalization factor extracted from first preprocessed image to the enhancement operation to generate third output images at different scales, said third multi-scale center-surround filter bank merging said output images to produce a third component image of the fused image, said third component image comprising enhanced image detail present in said second preprocessed image and not present in said first preprocessed image; and
a color display adapted to receive the first, second and third component images of the fused image, map each component image to a different color and to display the fused image including the enhanced image details in respective colors;
wherein each center-surround filter in each of said first, second and third multi-scale center surround filter banks applies the contrast enhancement operator to center and surround regions around each pixel of the first and second preprocessed images and calculates the adaptive normalization factor from a normalization region around each pixel from the same image as the surround region, said normalization region being larger than said center and surround regions but smaller than the entirety of said first and second images.

17. The imaging apparatus of claim 16, in which the first input image is produced by a first sensor sensitive to electromagnetic energy in a first portion of the electromagnetic energy spectrum and the second input image is produced by a second sensor sensitive to electromagnetic energy in a second portion of the electromagnetic energy spectrum.

\* \* \* \* \*